US006992134B2

(12) United States Patent
Croley

(10) Patent No.: US 6,992,134 B2
(45) Date of Patent: Jan. 31, 2006

(54) POLYURETHANE SYSTEM AND APPLICATION THEREOF

(76) Inventor: Tim Croley, 122 Cedarwood Trail NW., Cleveland, TN (US) 37312

( * ) Notice: Subject to any disclaimer, the term of this patent is extended or adjusted under 35 U.S.C. 154(b) by 40 days.

(21) Appl. No.: 10/282,591

(22) Filed: Oct. 29, 2002

(65) Prior Publication Data
US 2004/0081830 A1 Apr. 29, 2004

(51) Int. Cl.
*C08G 18/22* (2006.01)
(52) U.S. Cl. .................. 524/871; 524/872; 428/424.8; 428/423.9; 427/393.6; 427/385.5; 427/413
(58) Field of Classification Search ................ 524/871, 524/872; 428/424.8, 423.9; 427/393.6, 427/385.5, 413
See application file for complete search history.

(56) References Cited

U.S. PATENT DOCUMENTS

| 4,066,599 | A | * | 1/1978 | Zimmerman | ................ 523/218 |
|---|---|---|---|---|---|
| 4,341,689 | A | | 7/1982 | Doshi et al. | |
| 4,570,270 | A | * | 2/1986 | Oechsle, III | ................ 128/898 |
| 4,824,595 | A | | 4/1989 | Richter et al. | |
| 4,859,735 | A | * | 8/1989 | Vu | .............................. 524/780 |
| 5,212,210 | A | | 5/1993 | Halm | |
| 6,420,493 | B1 | | 7/2002 | Ryckis-Kite et al. | |
| 6,458,898 | B1 | | 10/2002 | Wamprecht et al. | |

FOREIGN PATENT DOCUMENTS

JP  4-170414  * 6/1992

* cited by examiner

*Primary Examiner*—Rachel Gorr
(74) *Attorney, Agent, or Firm*—Adams and Reese LLP

(57) ABSTRACT

The present invention relates to a polyurethane surface and more specifically to a polyurethane surface derived from the catalyzed reaction of equivalent volumes of a polyisocyanate component and an active hydrogen component. The two-component system achieves optimal gel time and cure response for application as an athletic surface having an isocyanate index between about 105 and 115. Moreover, the present invention achieves these results with a 1:1 by volume two-component system, which minimizes mixing errors during application of the surface.

38 Claims, 2 Drawing Sheets

POLYURETHANE SYSTEM AND APPLICATION THEREOF

STATEMENT REGARDING FEDERALLY SPONSORED RESEARCH OR DEVELOPMENT

Not Applicable

FIELD OF THE INVENTION

The present invention relates to a polyurethane surface and more specifically to a polyurethane surface derived from the catalyzed reaction of equivalent volumes of a polyisocyanate component and an active hydrogen component. Even more specifically, the present invention is related to a polyurethane surface formed by a two-component system, wherein substantially equivalent volumes of the two components are utilized and optimal gel time and cure response are maintained for the application of the polyurethane as an athletic surface.

BACKGROUND OF THE INVENTION

Polyurethanes are polymers that contain a significant number of urethane linkages within its molecular chain. The urethane linkages are formed by the condensation reaction of an isocyanate and an active hydrogen compound. The reaction product of the condensation reaction depends upon the structure of the active hydrogen compound. The reaction of an isocyanate with a hydroxyl group forms urethane, while the reaction with a primary amine forms a substituted urea. The reaction of isocyanates with carboxylic acids, which produces amides, and the reaction of isocyanates with water, which produces amines, both result in the liberation of carbon dioxide gas.

Thousands of different polyurethanes can be made from the array of commercially available isocyanate and active hydrogen compounds. They are typically divided into two categories, namely one-component systems and two-component systems.

The most common type of one-component system is a specially formulated prepolymer that is allowed to moisture cure with water vapor in the atmosphere. Other one-component systems are allowed to vapor cure under an amine atmosphere. One-component systems can also be produced by chemically blocking isocyanate groups from reacting with active hydrogen compounds. Heat is applied to break the bonds of the blocking groups, allowing the polyurethane to cure.

Two-component systems may take one of two forms. The first, known as a one-shot system, comprises a resin component, which is a blend of an active hydrogen compound or mixture of active hydrogen compounds with catalysts, crosslinkers, surfactants, flame retardants, plasticisers, fillers, etc., that is mixed with an isocyanate component, made up of only polyisocyanate. The second form of two-component system is known as a prepolymer system. First, a prepolymer is formed by reacting a portion of the polyisocyanate with an active hydrogen compound, which results in a polyisocyanate rich component, sometimes referred to as the B component. The prepolymer is then reacted with a chain extender, sometimes referred to as the A component, which is a blend of an active hydrogen compound or mixture of active hydrogen compounds with catalysts, crosslinkers, surfactants, flame retardants, plasticisers, fillers, etc. The chain extender increases the molecular weight of the prepolymer molecules and creates the final polyurethane polymer.

The conventional application of polyurethane as an athletic surface typically comprises a composite of rubber particles bound with a two-component polyurethane system to form a base mat. The two components of the polyurethane system are generally mixed on site along with the rubber particles to form the composite surface. The base mat may be used alone, or it may be enhanced by the addition of a structural spray comprising a mixture of polyurethane and rubber sprayed on top the base mat creating a textured surface. The base mat can also be coated with a flood coat of polyurethane and rubber. Alternatively, a full-pour system may be employed in which multiple layers are mixed and poured in place.

Regardless of the method employed, the formulation of the polyurethane system is of critical importance. Since the polyurethane is mixed on site, the formulation must be simple to use. The ideal formulation would comprise substantially equivalent volumes of the two components (a 1:1 system), which would reduce mixing errors. The formulation should also have an adequate gel time to permit the proper preparation of the surface, i.e. mixing, pouring, raking, etc. Further, adequate curing of the polyurethane should occur over a relatively broad range of ambient temperatures and relative humidity, and should be sufficient to ensure that the proper physical properties of the surface or attained. Finally, the formulation should minimize deleterious effects to the persons preparing the surface and to the environment. While conventional polyurethane systems may have addressed some of these issues individually, a system has not been formulated that addresses all of these issues and provides an athletic surface having acceptable physical properties.

PREFERRED EMBODIMENTS OF THE INVENTION

Figure 1:
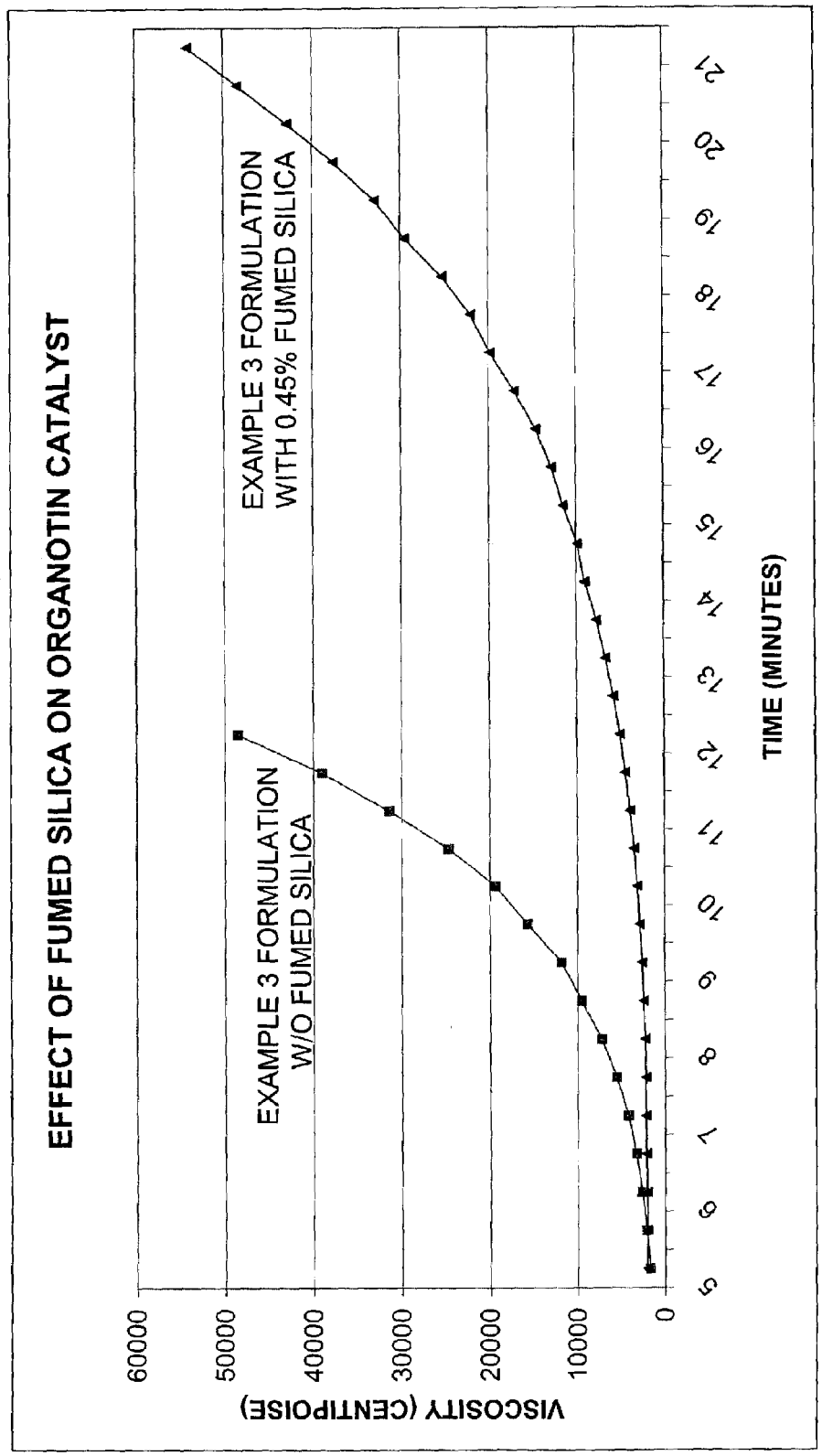
FIG. 1 is a graph of viscosity vs. time illustrating the reaction-delaying effect of fumed silica.

In the following detailed description of the preferred embodiments, reference is made to the accompanying drawing which forms a part hereof, and exemplary formulations are provided in which are shown by way of illustration specific embodiments in which the invention may be practiced. It is to be understood that other embodiments may be utilized, structural changes may be made, and formulations may be modified without departing from the scope of the present invention.

Polyurethane surfaces of the present invention may be derived from both aromatic and aliphatic polyisocyanates, which are commercially available for use in polyurethane formulations. Aromatic polyisocyanates are generally faster reacting than aliphatic polyisocyanates. The most common aromatic polyisocyanates are the 2,4 and 2,6 isomers of toluene diisocyanate (TDI) and polyisocyanate products based upon diphenylmethane 4,4' diisocyanate (MDI). Pure 4,4' MDI is commercially available, as well as blends of the pure material with either other MDI isomers, for example 2,4 MDI, or mixtures of MDI oligomers (known as crude MDI). The most common aliphatic polyisocyanates are based upon isophorone diisocyanate and hexamethylene diisocyanate. These monomers may be modified to produce a range of dimers, trimers and biurets. In addition to aromatic and aliphatic polyisocyanates, cycloaliphatic, araliphatic, and heterocyclic polyisocyanates, as well as modified polyisocyanates, those containing groups such as allophanate isocyanuarte, urethane, urea, and the like, may also be employed. The preferred formulation comprises a mixture of the 4,4' MDI and the 2,4 MDI isomers.

The active hydrogen component of the present invention contains one or more compounds having isocyanate-reactive hydrogens. These compounds may include polyether polyols, polymer polyols, polyester polyols, polythioesters, polyacetal-containing polycarbonates, polyester amides, and modified natural polyols, such as castor oil, carbohydrates and starch. The preferred active hydrogen component is a mixture of three or more of these compounds to yield adequate gel time, cure, hydrophobicity and proper specific gravity.

The polyisocyanate component of the present invention is preferably delivered as a prepolymer system. The prepolymer composition contains the selected polyisocyanate or mixture of polyisocyanates along with an active hydrogen compound, which reacts with the polyisocyanate to form urethane linkages. An excess of polyisocyanate is employed to prevent gelling of the prepolymer composition. Any of the active hydrogen compounds employed in the active hydrogen component of the polyurethane system can be used in the preparation of the prepolymer. The preferred active hydrogen component contained in the prepolymer is a low molecular weight polyol, which provides for a faster cure of the polyurethane surface.

The polyurethane system of the present invention may also contain additional materials, such as catalysts, crosslinkers, surfactants, flame retardants, plasticisers, fillers, pigments, UV stabilizers, antioxidants, microbiocides, algaecides, dehydrators, thixotropic agents, wetting agents, flow modifiers, deaerators and extenders. The additives are chosen based on the requirements of the particular application and compatibility with the other system components. While one or more of these additives may be present in the B component, the additives are preferably combined into the A component to better formulate the 1:1 ratio.

Suitable fillers include inorganic fillers, such as calcium carbonate and siliceous material, metal oxides, such as, kaolin, aluminum oxides, aluminum silicates, titanium oxides, and iron oxides, metal salts, such as chalk and barium sulfate, and organic fillers, such as carbon black, melamine, rosin, and polymers. Reinforcing fibrous fillers could also be used when a stiffness of the surface is desired. Several of these fillers also impart color to the polyurethane system. Additional pigments, such as metal oxides, azo and diazo dyes, phthalocyanines, and diazines, maybe employed to achieve the desired finish.

Surface-active additives, including wetting agents, such as fluorosurfactants, may be employed to incorporate greater quantities of fillers into the polyurethane system. These additives also improve the flow properties of the polyurethane system and aid application. Antifoams, such as fluoromodified polysiloxanes, methylalkyl polysiloxanes, and silcone-free polymeric defoamers, may be employed to decrease the foaming tendency of surface-active agents. Air release agents, such as fluorosilcone solutions, may also be employed in addition to antifoams to accelerate their action.

Moisture scavengers, such as molecular sieves, oxazolidine, and p-toluenesulfonyl isocyanate, may be employed to prevent contamination due to atmospheric humidity.

Suitable UV stabilizers include substituted resorcinols, salicylates, benzotriazoles and benzophenones, and sterically hindered amines.

Plasticizers may be employed to alter the properties of the polyurethane surface and/or reduce the viscosity of the polyurethane component composition making it easier to process and handle. Suitable plasticisers include phthalates, phosphates, chlorinated biphenyls and aromatic oils.

The reaction of isocyanates with hydroxyl groups is relatively slow in the absence of a catalyst. In order to achieve sufficient reaction rates and cured properties, many different types of catalysts are used in polyurethane systems. Suitable catalysts for the present invention include: tertiary amines; salts, such as phenol salt, hexanoate, oleate, and the like; strong bases, such as alkali and alkaline earth metal hydroxides, alkoxides, and phenoxides; acidic metal salts of strong acids, such as ferric chloride, stannic chloride, bismuth nitrate and chloride, and the like; chelates of various metals such as those that can be obtained from acetylacetone, benzoylacetone, trifluoroacetyl acetone, ethyl acetoacetate and the like with metals, such as beryllium, magnesium, zinc, cadmium, lead, titanium, zirconium, tin, arsenic, bismuth, chromium, molybdenum, manganese, iron, cobalt and nickel; alcoholates and phenolates of various metals, such as Ti(OR), Sn(OR), Al(OR), and the like, wherein R is alkyl or aryl and the reaction products of alcoholates with carboxylic acids, beta-diketones, and 2-(N, N-dialkylamino)alcohols; salts of organic acids with a variety of metals such as alkali metals, alkaline earth metals, aluminium, tin, lead, manganese, cobalt, nickel and copper; organometallic derivatives of tetravalent tin, trivalent and pentavalent arsenic, antimony, and bismuth and metal carbonyls of iron and cobalt, mercury compounds, such as arylmercury carboxylates, phenylmercury acetate and propionate, and the like. These catalyst may be used alone or in combination.

The two-component polyurethane system of the present invention extends gel time (also known as pot life) without sacrificing cure response, which makes it particularly useful for constructing athletic surfaces. After mixing the components of the two-component system, there is a limited amount of time before the material develops a viscosity that prevents proper application of the product. Conventional polyurethane systems have attempted to provide a similar balance between pot life and cure response by formulating catalyst blends that simulate the delayed catalytic activity of mercury compounds, which have limited use due their toxicity. For example, the reversible hydrolysis of certain bismuth catalysts has been used to achieve a delayed reaction. Volatile chelating agents have also been employed to inhibit metal catalyst, but the release of the volatile chelating agent may expose persons applying the polyurethane surface to harmful vapors. Even with the implementation of these conventional delayed action systems, a two-component system has not been developed that would reduce the possibility of mixing errors during application and result in a polyurethane with suitable physical properties for use as an athletic surface. One preferred embodiment of the present invention provides an improved formulation by employing an effective amount of fumed silica as part of the A component as a reaction-delaying agent, which extends pot life sufficiently to allow proper application of the polyurethane surface, without significantly increasing the viscosity of the A component. The presence of between about 0.25 wt % and about 0.9 wt % fumed silica allows isocyanate/polyol/catalyst blends that previously exhibited shortened pot life as the ideal equivalent volume ratio of A component to B component was approached. One preferred embodiment of the present invention utilizes an organotin catalyst, previously thought to have too fast of a reaction rate for preparation of athletic surfaces. However, the addition of an effective amount of fumed silica sufficiently extends pot life and permits the use of fast-acting catalysts. While the preferred embodiment of the present invention The following examples are provided to illustrate the invention, but are not intended to limit the scope thereof.

EXAMPLE 1

A Component:

| | |
|---|---|
| Polyether diol, avg. M.W. of 2000 | 25.05 wt % |
| Polyether triol, approx. 240 mg KOH/g | 3.78 wt % |
| Dipropylene glycol | 8.32 wt % |
| Ricinus oil | 18.90 wt % |
| Barium Sulfate | 15.12 wt % |
| Calcium Carbonate | 19.66 wt % |
| Iron Oxide | 2.45 wt % |
| Fluorosurfactant | 0.05 wt % |
| Organotin catalyst | 0.02 wt % |
| Iron acetylacetonate | 0.02 wt % |
| Phthalate of C7–C11 alcohols | 3.78 wt % |
| Molecular sieve | 1.25 wt % |
| Polysiloxane | 0.30 wt % |
| Hindered amine UV Stabilizer | 0.80 wt % |
| Fumed silica | 0.50 wt % |

B Component:

| | |
|---|---|
| Modified diphenylmethane 4,4'-diisocyanate | 20.00 wt % |
| High 2,4 isomer blend of diphenylmethane diisocyanate | 26.00 wt % |
| Polyether diol, avg. M.W. of 2000 | 54.00 wt % |

The A component and B component of Example 1 were mixed at a 1:1 volume ratio and allowed to cure at 75° F. The resulting polyurethane surface exhibited a gel time of 18 minutes and a sufficient cure time for an athletic surface application.

EXAMPLE 2

The polyurethane formulation of Example 1 was compared to a similar formulation that did not contain fumed silica. Both two-component systems were mixed and allowed to cure at 75° F. The formulation that did not contain fumed silica exhibited a gel time of 7 minutes, 35 seconds. The formulation containing fumed silica exhibited a 237% increase in gel time without significantly effecting cure response for an athletic surface application.

EXAMPLE 3

A Component:

| | |
|---|---|
| Polyether diol, avg. M.W. of 2000 | 19.07 wt % |
| Dipropylene glycol | 7.50 wt % |
| Ricinus oil | 28.16 wt % |
| Barium Sulfate | 37.58 wt % |
| Iron Oxide | 2.33 wt % |
| Organotin catalyst | 0.03 wt % |

-continued

| | |
|---|---|
| Fluorosilicone | 0.90 wt % |
| 2,2,4-trimethyl-1,3-pentanediol diisobutyrate | 1.21 wt % |
| Molecular sieve | 1.18 wt % |
| Polysiloxane | 0.50 wt % |
| Hindered amine UV Stabilizer | 0.75 wt % |
| Fumed silica | 0.79 wt % |

B Component:

| | |
|---|---|
| High 2,4 isomer blend of diphenylmethane diisocyanate | 18.87 wt % |
| Polyether diol, avg. M.W. of 2000 | 51.03 wt % |
| Polymeric dimethylene diisocyanate | 30.00 wt % |
| Fluorosilicone | 0.10 wt % |

The A component and B component of Example 3 were mixed at a 1:1 volume ratio and allowed to cure at 75° F. During the cure, a viscometer was employed to measure the rate of reaction. The data obtained is illustrated in FIG. 1 and shows the reaction delaying properties of fumed silica. An air release agent was added to the B component, which is formulated as a prepolymer, to improve dispersion of the 2,4 isomer blend and the polymeric dimethylene diisocyanate.

The exemplary 1:1 two-component polyurethane formulations of Examples 1 and 3 are well suited for preparing an athletic surface. Since the volumes of component A and B are substantially equivalent, the potential for mixing errors is minimized. Further, the gel time is adequately extended to between about 18 minutes to about 30 minutes, which permits the surface to be mixed, poured and raked before the viscosity of the system reaches values that prevent proper application. The overnight cure response at ambient temperatures ranging from about 60° F. to about 95° F. is also adequate to allow surface finishing work to proceed the next day. Athletic surfaces prepared using formulations according to the present invention exhibit Shore A-2 hardness between about 50 and about 70, tensile strengths between about 200 and about 300 psi, compression between about 5% and about 7% at 25 psi and about 35% to about 40% at 270 psi, and little change in resiliency between about 35° F. to about 120° F.

Figure 2:
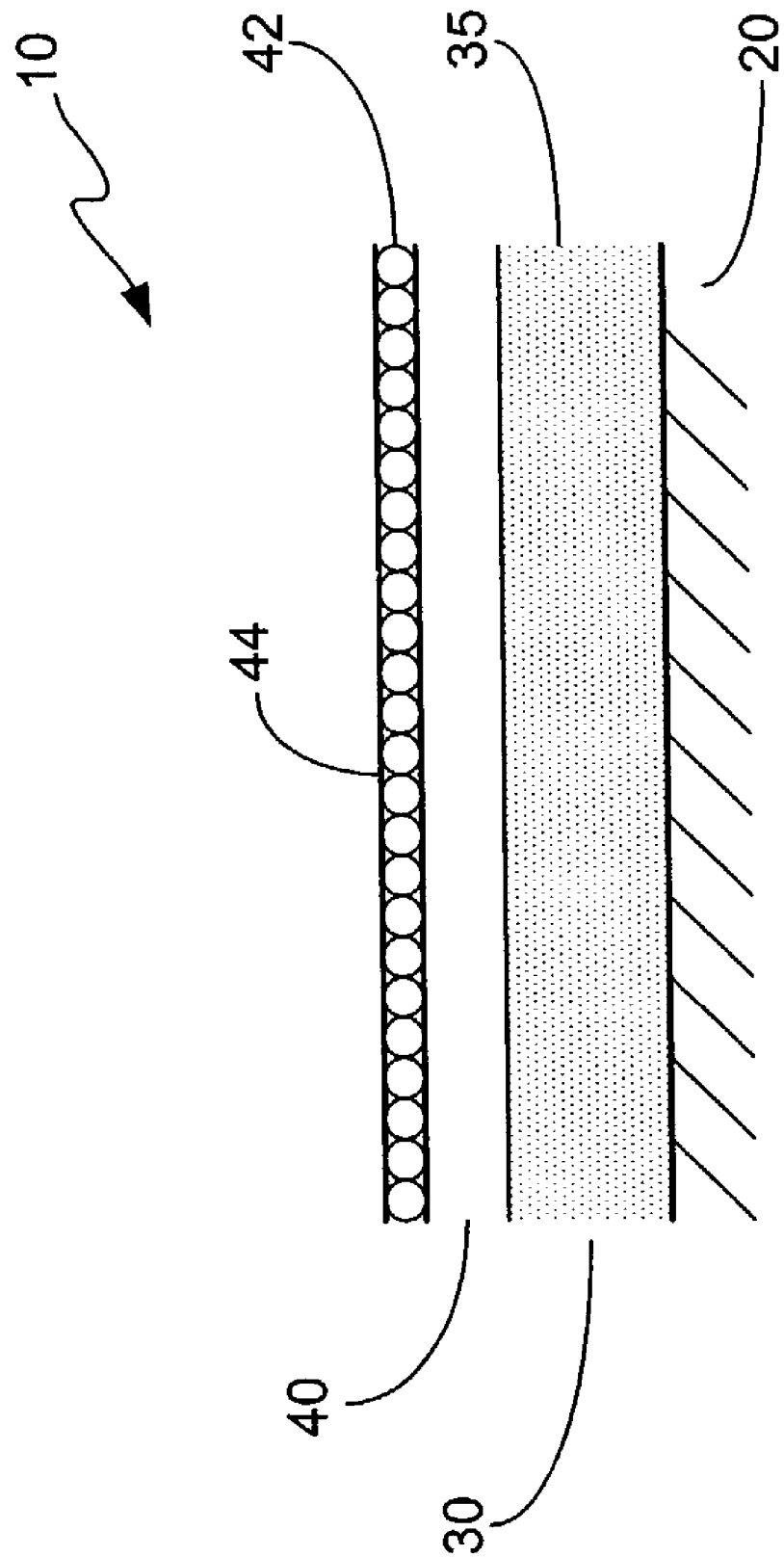
FIG. 2 is a side cross-sectional view of one preferred embodiment of an athletic surface utilizing the two-component polyurethane system of the present invention.

FIG. 2 illustrates one preferred embodiment of an athletic surface 10 utilizing the two-component polyurethane system of the present invention. The athletic surface 10 is applied on sub-base 20. The sub-base 20 may be any suitable foundation, but an asphalt sub-base is preferred. The two-component polyurethane system of the present invention is then utilized to form base layer 30. After mixing component A and component B of the two-component polyurethane system, resilient particles 35 are incorporated into the liquid mixture of the two components. The resilient particles 35 may be constructed of any suitable elastomeric material, but is preferably rubber granules. The two-component polyurethane/resilient particle mixture is then poured over the sub-base 20. A single base layer 30 may be sufficient for a particular application or additional base layers may be built upon lower base layers to achieve a predetermined thickness. Depending on the application of the athletic surface being prepared, the base layer 30 alone may be sufficient. However, some applications require additional surface preparation as shown in FIG. 2. A top layer 40 may be installed over the base layer 30. The top layer 40 is prepared utilizing the same two-component polyurethane system as the base layer 30, but without pre-mixing resilient particles.

After pouring the top layer 40, resilient particles 42 are broadcasted over and embedded into the surface of the top layer 40, providing a textured surface. A final polyurethane coating 44 is then applied over the resilient particles 42 to ensure proper adhesion. The final polyurethane coating 44 is preferably an aliphatic coating, which provides superior UV stabilization.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A resilient athletic surface comprising: a sub-base and a layer of substantially homogeneous composite material over said sub-base, said substantially homogeneous composite material comprising resilient granules and a two-component polyurethane binder system having a first component comprising at least one compound having active hydrogen atoms capable of reacting with isocyanate funtionality, at least one catalyst to accelerate the reaction and formation of urethane linkages, and an effective amount of fumed silica to delay the action of said catalyst, and a second component comprising at least one polyisocyanate.

2. The resilient athletic surface of claim 1, wherein said first component has a sufficient density to permit reaction with said second component by mixing substantially equivalent volumes of said first and said second components.

3. The resilient athletic surface of claim 1, further comprising a second layer over said layer of substantially homogeneous composite material, said second layer comprising a two-component polyurethane system having a first component comprising at least one compound having active hydrogen atoms capable of reacting with isocyanate functionality, at least one catalyst to accelerate the reaction and formation of urethane linkages, and an effective amount of fumed silica to delay the action of said catalyst, a second component comprising at least one polyisocyanate, said first component having a sufficient density to permit reaction with said second component by mixing substantially equivalent volumes of said first and said second components; and having a textured upper surface formed by the embedding of resilient granules into said upper surface of said second layer.

4. The resilient athletic surface of claim 3, further comprising an aliphatic polyurethane top coat over said second layer.

5. The resilient athletic surface of claim 1, wherein said first component of said two-component polyurethane binder system has a sufficient hydroxyl equivalent weight to form a polyurethane having an isocyanate index between about 105 to about 115.

6. The resilient athletic surface of claim 1, wherein said at least one compound having active hydrogen atoms capable of reacting with isocyanate functionality comprises a solution of at least one polyester polyol and at least one polyether polyol.

7. The resilient athletic surface of claim 6, wherein said polyester polyol is castor oil.

8. The resilient athletic surface of claim 1, wherein said at least one catalyst is a tertiary amine.

9. The resilient athletic surface of claim 1, wherein said at least one catalyst is selected from the group consisting of a phenol salt, hexanoate, and oleate.

10. The resilient athletic surface of claim 1, wherein said at least one catalyst is selected from the group consisting of an alkali earth metal hydroxide, an alkaline earth metal hydroxide, an alkoxide, and a phenoxide.

11. The resilient athletic surface of claim 1, wherein said at least one catalyst is selected from the group conssting of ferric chloride, stannic chloride, bismuth nitrate and bismuth chloride.

12. The resilient athletic surface of claim 1, wherein said at least one catalyst is a chelate of a metal selected from the group consisting of beryllium, magnesium, zinc, cadmium, lead, titanium, zirconium, tin, arsenic, bismuth, chromium, molybdenum, manganese, iron, cobalt and nickel.

13. The resilient athletic surface of claim 1, wherein said at least one catalyst is an alcoholate of a metal selected from the group consisting of titanium, tin, and aluminum.

14. The resilient athletic surface of claim 1, wherein said at least one catalyst is a phenolate of a metal selected from the group consisting of titanium, tin, and aluminum.

15. The resilient athletic surface of claim 1, wherein said at least one catalyst is a salt of an organic acid with a metal selected from the group consisting of an alkali earth metal, an alkaline earth metal, aluminum, tin, lead, manganese, cobalt, nickel and copper.

16. The resilient athletic surface of claim 1, wherein said at least one catalyst is an organometallic derivative of a compound selected from the group consisting of tetravalent tin, trivalent arsenic, pentavalent arsenic, antimony, and bismuth.

17. The resilient athletic surface of claim 1, wherein said at least one catalyst is a metal carbonyl of a compound selected from the group consisting of iron, cobalt, an arylmercury carboxylate, a phenylmercury acetate and a phenylmercury propionate.

18. The resilient athletic surface of claim 1, wherein said second component comprises an isomer blend of 2,4 diphenylmethane diisocyanate and 4,4' diphenylmethane diisocyanate.

19. The resilient athletic surface of claim 1, wherein said second component comprises a mixture of a polymeric dimethylene diisocyanate and an isomer blend of 2,4 diphenylmethane diisocyanate 4,4' diphenylmethane diisocyanate.

20. The resilient athletic surface of claim 1, wherein said second component comprises an air release agent.

21. The resilient athletic surface of claim 1, wherein said second component is a prepolymer further comprising a compound having active hydrogen atoms capable of reacting with isocyanate functionality.

22. The resilient athletic surface of claim 21, wherein said compound having active hydrogen atoms capable of reacting with isocyanate functionality is a polyether polyol.

23. A method of preparing a resilient athletic surface comprising the steps of: providing a sub-base and preparing a layer of substantially homogeneous composite material over said sub-base, said substantially homogeneous composite material comprising resilient granules and a two-component polyurethane binder system having a first component comprising at least one compound having active hydrogen atoms capable of reacting with isocyanate functionality, at least one catalyst to accelerate the reaction and formation of urethane linkages, and an effective amount of fumed silica to delay the action of said catalyst, and a second component comprising at least to polyisocyanate.

24. The method in accordance with claim 23, wherein said first component has a sufficient density to permit reaction with said second component by mixing substantially equivalent volumes of said first and said second components.

25. The method in accordance with claim 23, wherein said first component has a sufficient hydroxyl equivalent weight to form a polyurethane having an isocyanate index between about 105 to about 115.

26. The method in accordance with claim 23, wherein said at least one compound having active hydrogen atoms capable of reacting with isocyanate functionality comprises a solution of at least one polyester polyol and at least one polyether polyol.

27. The method in accordance with claim 26, wherein said polyester polyol is castor oil.

28. The method in accordance with claim 23, wherein said at least one catalyst is an organotin catalyst.

29. The method in accordance with claim 23, wherein said second component comprises an isomer blend of 2,4 diphenylmethane diisocyanate and 4,4' diphenylmethane diisocyanate.

30. The method in accordance with claim 23, wherein said second component comprises a mixture of a polymeric dimethylene diisocyanate and an isomer blend of 2,4 diphenylmethane diisocyanate and 4,4' diphenylmethane diisocyanate.

31. The method in accordance with claim 23, wherein said second component comprises an air release agent.

32. The method in accordance with claim 23, wherein said second component is a prepolymer further comprising a compound having active hydrogen atoms capable of reacting with isocyanate functionality.

33. The method in accordance with claim 23, wherein said compound having active hydrogen atoms capable a reacting with isocyanate functionality is a polyether polyol.

34. The method in accordance with claim 23, further comprising the step of providing a second layer over said layer of substantially homogeneous composite material, said second layer comprising a two-component polyurethane system having a first component comprising at least one compound and having active hydrogen atoms capable of reacting with isocyanate functionality, at least one catalyst to accelerate the reaction and formation of urethane linkages, and an effective amount of fumed silica to delay the action of said catalyst, a second component comprising at least one polyisocyanate, said first component having a sufficient density to permit reaction with said second component by mixing substantially equivalent volumes of said first and said second components; and having a textured upper surface formed by the embedding of resilient granules into said upper surface of said second layer.

35. The method in accordance with claim 34, further comprising the step of providing an aliphatic polyurethane top coat over said second layer.

36. A two-component polyurethane binder system comprising: a first component comprising at least one compound having active hydrogen atoms capable of reacting with isocyanate functionality, at least one catalyst to accelerate the reaction and formation of urethane linkages, and an effective amount of fumed silica to delay the action of said catalyst; and a second component comprising a least one polyisocyanate; the first component having a sufficient density to permit reaction with said second component by mixing substantially equivalent volumes of said first and said second components; and wherein said at least one catalyst is a chelate of a metal selected from the group consisting of beryllium, magnesium, zinc, cadmium, lead, titanium, zirconium, tin, arsenic, bismuth, chromium, molybdenum, manganese, iron, cobalt and nickel.

37. A two-component polyurethane binder system comprising: a first component comprising at least one compound having active hydrogen atoms capable of reacting with isocyanate functionality, at least one catalyst to accelerate the reaction and formation of urethane linkages, and an effective amount of fumed silica to delay the action of said catalyst; and a second component comprising at least one polyisocyanate; the first component having a sufficient density to permit reaction with said second component by mixing substantially equivalent volumes of said first and said second components; and wherein said at least one catalyst is an alcoholate of a metal selected from the group consisting of titanium, tin, and aluminum.

38. A two-component polyurethane binder system comprising: a first component comprising at least one compound having active hydrogen atoms capable of reacting with isocyanate functionality, at least one catalyst to accelerate the reaction and formation of urethane linkages, and an effective amount of fumed silica to delay the action of said catalyst; and a second component comprising at least one polyisocyanate; the first component having a sufficient density to permit reaction with said second component by mixing substantially equivalent volumes of said first and said second components; and wherein said at least one catalyst is a phenolate of a metal selected from the group consisting of titanium, tin, and aluminum.

* * * * *